Jan. 10, 1928.
K. D. UMRATH
1,655,583
METHOD AND APPARATUS FOR SHELLING CRUSTACEA
Filed May 4, 1925
3 Sheets-Sheet 1
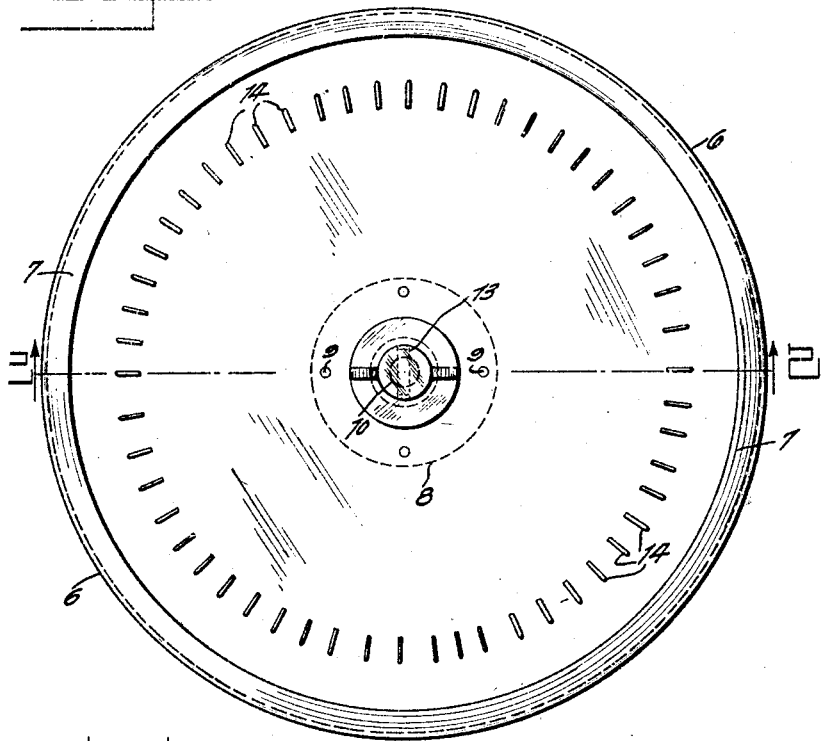
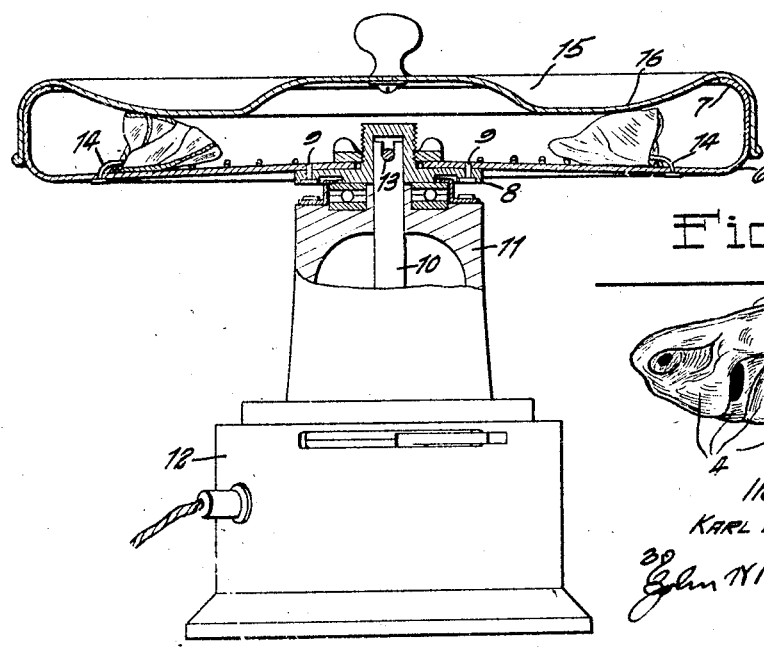
Inventor.
KARL D. UMRATH.
Attorney.

Jan. 10, 1928.　　　　　　　　　　　　　　　　1,655,583
K. D. UMRATH
METHOD AND APPARATUS FOR SHELLING CRUSTACEA
Filed May 4, 1925　　　3 Sheets-Sheet 2

Inventor:
KARL D. UMRATH.

Jan. 10, 1928.  
K. D. UMRATH  
1,655,583  
METHOD AND APPARATUS FOR SHELLING CRUSTACEA  
Filed May 4, 1925    3 Sheets-Sheet 3
Fig. 6.
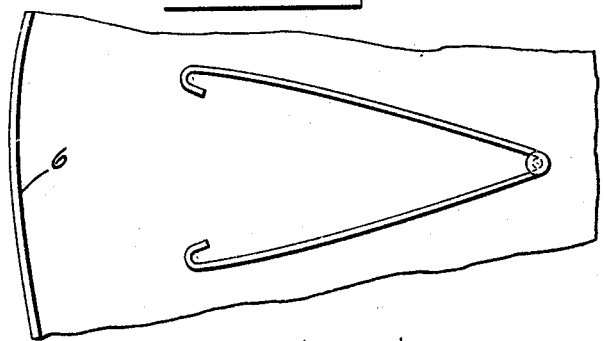
Fig. 7.
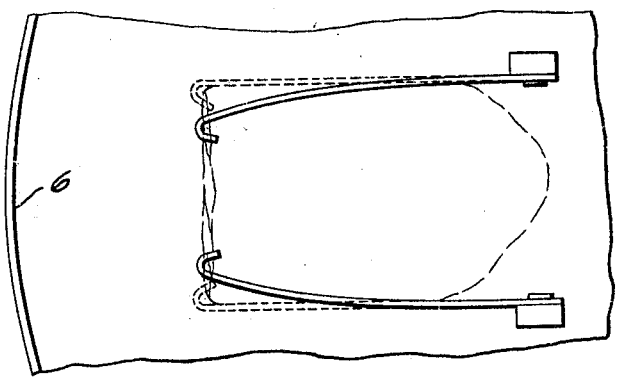
Fig. 8.    Fig. 9.
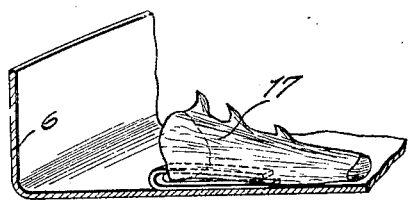    
Fig. 10.
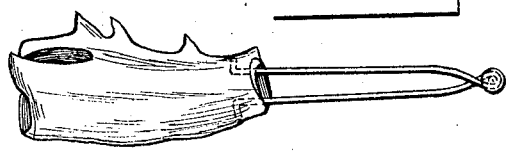
Inventor:
KARL D. UMRATH.

Patented Jan. 10, 1928.

1,655,583

UNITED STATES PATENT OFFICE.

KARL D. UMRATH, OF ST. LOUIS, MISSOURI.

METHOD AND APPARATUS FOR SHELLING CRUSTACEA.

Application filed May 4, 1925. Serial No. 27,644.

This invention pertains to a method and apparatus for extracting the meat from Crustacea.

In preparing the meat of Crustacea, and more particularly crab meat, the same is extracted from the crab shell and is then packed in suitable containers for the market. The meat is most conveniently extracted from the crab shell by subjecting the same to the action of centrifugal force so as to throw the same from the shell. In performing this operation, however, some difficulty has been experienced in extracting the meat in an unbroken condition. In most devices for this purpose the meat is usually torn, shredded or bruised so as to render it less desirable as a market product than hand picked meat.

One of the objects of this invention, therefore, is to provide a method and apparatus which will extract the meat from the shell without unnecessary tearing or bruising the meat or sub-dividing it into small particles.

Another object is to provide such a method and apparatus which will be simple and economical to use.

Another difficulty experienced with both hand and centrifugal methods is that all of the meat is not removed from the shell, but a certain quantity escapes the picker or, in centrifugal devices, becomes lodged in the holding devices. Furthermore, in many instances, parts of the bone or shell are broken off by the meat in passing out of the shell and are deposited with the picked meat, so that the resulting product must be hand picked again or suffer in quality on account of the liability of particles of shell being found therein.

Another object of this invention, therefore, is to provide a method and apparatus by which a greater proportion of the meat may be extracted and in which the liability of shell fragments being deposited therewith is reduced to a minimum.

The crab meat is divided into three grades, depending on the region of the body from which it is taken. The three are usually kept separate by the pickers and quoted separately on the market. The "lump" meat is considered to be the best and commands the highest price. It consists of the meat from the muscles which operate the swimming legs, or back fins. The "white" or "flake" meat ranks next in value and is made up from the remaining muscles of the body with the exception of the claws. The "claw", as the meat from the last is known, ranks lowest in price because of its dark color, though it is considered by many to have the best flavor of the three grades.

Another object of this invention, therefore, is to provide a method and apparatus by which the meat may be extracted from the shells of Crustacea and in which the different grades of meat are divided and kept separated.

Another object is to provide a method and apparatus by which the shells may be picked more quickly and in a cleaner and more sanitary manner.

Further objects will appear from the following description taken in connection with the accompanying drawings in which:

Figure 1 is a plan view of an extracting device embodying this invention, with the cover removed;

Figure 2 is a section on line 2—2 of Figure 1 with the cover in place;

Figure 5 represents a view of the half of an empty crab shell, seen from the open end;

Figure 11:
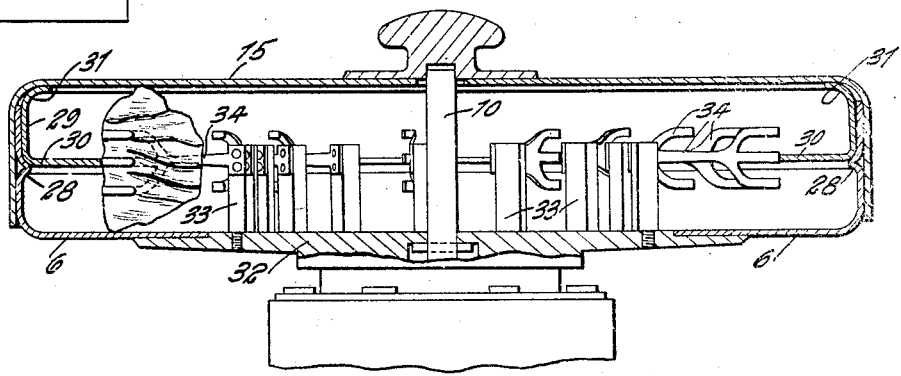

Figures 6, 7, 8, 9, and 10 are views illustrating various methods of retaining the shell during the centrifugal operation; and Figure 11 is a sectional view of a device illustrating another embodiment of the invention.

Referring now to the drawings and more particularly to Figure 5, this view represents a half shell as seen from the open end of the lobes. In this view 1 represents the bottom or belly of the crab and 2 the top from which the hard outer shell has been removed. In the rear portion of the shell there is a large lobe 3 which contains the lump meat. In the middle and forward parts of the shell are the smaller lobes 4 containing the second grade or flake meat. In preparing the crabs for extraction of the meat the appendages such as the legs and claws are first removed. The body is then divided down the middle in a direction transversely of the lobes. When this has been done there ordinarily remains a shell part 5 projecting transversely of one of the large lobes 3. This shell part may now be removed so as not to interfere with the free passage of the lump meat from the shell. The shells are now placed in the apparatus presently to be described wherein they are subjected to the action of centrifugal force to throw the meat out of the shell.

Referring now more particularly to Figures 1 and 2, 6 designates a carrier in the form of a circular pan whose rim may be provided with an inturned flange 7. The carrier 6 is mounted on a plate 8, being accurately centered thereon by means of a series of dowels 9. The plate 8 is arranged for mounting on a vertical shaft 10 journalled in a support 11 and driven by a motor 12 or other suitable source of power. The plate 8 may be keyed to the shaft 10 by means of a transverse pin 13 fitting a notch in the end of the shaft so that the plate 8 and the carrier may be removed therefrom as shown in Figure 2. The carrier 6 is provided on the interior thereof with a series of hooks 14 arranged in a circle therearound and spaced from the rim. These hooks may be fixed in place by riveting or any other suitable means.

In operating this device the crabs, having been prepared as described above, are placed in the pan 6 preferably with their bottoms down and their lower open edges engaging the hooks 14. When the pan has been filled with the shells all around the circle a cover 15 may be put over the pan after which the motor 12 may be started to rotate the same at a high speed. As the pan rotates the Crustacea are subjected to the action of a strong centrifugal force. Since the shells are retained by the hooks 14, the force acting on the meat will drive the same out of the shells to be thrown against the rim of the pan. The flange 7 prevents any of the meat or juices from being thrown out of the pan. Since the entire Crustacea, meat and shells alike, are acted upon by centrifugal force and are retained only at their lower edges, there will be a tendency for the shells to tip or pivot about their lower edges, from the action of the force. In order to prevent this the cover 15 is provided with a depressed portion 16 adapted to engage the tops of the shells so as to prevent any tipping movement.

The shells may, of course, be retained by any suitable type of retaining device several of which are illustrated in Figures 6 to 10 inclusive. Figures 6 and 7 illustrate different forms of said hooks which may be made to engage the sides of the shell as indicated in dotted lines in Figure 7. In Figures 8 and 9 a flat spring hook is shown into which such parts as claw shells 17 may be slipped and which will then retain the same not only against centrifugal force but will maintain them in a radially directed position. Figure 10 illustrates a spring hook engaging the interior of the claw shell. The crab shell may, of course, be similarly retained. It will be noted that in all of these cases, shells are so retained as to leave the open ends thereof entirely unobstructed so as to allow free passage of the meat therefrom without any retardation or mutilation of the meat by the holding devices.

Figure 3:
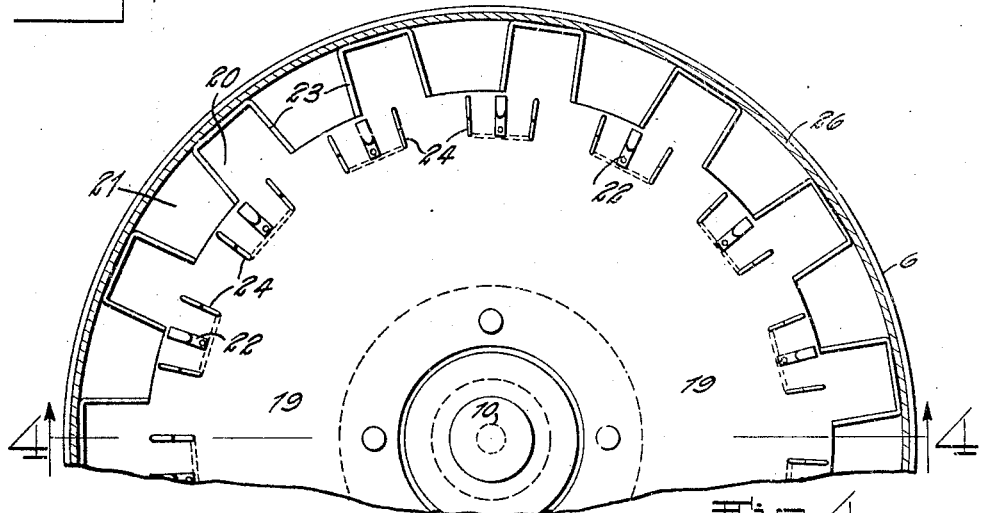
Figure 3 is a partial plan view with the cover removed of an extracting device showing another embodiment of this invention.
Figure 4:
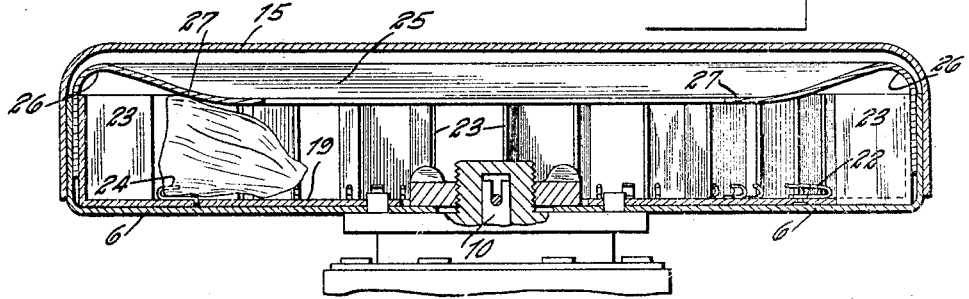
Figure 4 is a section on line 4—4 of Figure 3 with the cover in place.

Referring now more particularly to Figures 3, 4, and 11 these figures illustrate an embodiment of the invention in which the lump meat may be kept separated from the flake meat. In this case the carrier or pan 6 has loosely mounted therein a receiver 19 provided with a series of compartments 20 spaced about its periphery. These compartments 20 are arranged at intervals around the pan with their open sides facing the center thereof. The positioning is such as to leave gaps 21 between them all around the circle. Just within the circle of compartments 20 there is a circle of retaining hooks which are grouped as shown in Figure 3. It will be noted that in this grouping there is a central or main hook 22 standing directly opposite one of the partitions 23 forming a compartment 20. On each side of the hook 22 is an auxiliary hook 24. The prepared crab shells are mounted in the receiver 9 by engaging the same at their open edges with the hooks 22 and 24. The shell is so placed that the line of division between the lump meat and the flake meat thereof comes opposite the partition 23. The spacing of the hooks is such that if the center hook 22 is engaged with the shell at the first small lobe adjacent the lobe 3 the shell will be properly positioned so that the partition 23 will come opposite the line of division between the lump and the flake, so that when the pan is rotated, one kind of meat will be deposited in the compartment 20 and the other kind in the gap 21, the partition 23 operating to separate the two. At the completion of this operation all of the lump meat will be collected, say in the compartment 20, while all the flake meat will be in the gaps 21. It will be noted that the compartments 20 are all mounted in the receiver 19 while the gaps 21 are in the pan 6 which forms a receiver for the meat collected in those gaps. In order to retain the juices in the pan and also to assist in retaining the shells, a retaining ring 25 is provided which fits down over the receiver 19 outside of the compartments 20 and inside of the pan 6. This ring has a curved rim forming a gutter 26 which prevents the juice and particles of meat from flying out of the pan. This ring is also provided with a depressed portion 27 similar to the part 16 of Figure 2 which engages the upper part of the shell, as shown in Figure 4, to retain the same against tipping.

Upon completion of the extracting operation the operator may remove the cover 15 and the ring 25 and, after removing the empty shells, lift out the receiver 19 which contains the same grade of meat in all its compartments. This receiver may then be emptied into a suitable receptacle. The pan 6 may now be similarly removed and emptied into another receptacle since it contains another grade of meat. In this way the two grades of meat are separated and kept separate.

In the embodiment of Figure 11 the pan 6 is formed with an inwardly projecting annular bead 28 adapted to support thereon a ring 29 having a horizontal bottom 30 and an inturned flange 31. The pan 6 may be mounted on a spider 32 removably mounted on the shaft 10 as shown in Figure 11. Mounted on the spider 2 and suitably spaced from the outer rim of the pan is a ring of upright supports 33 upon each of which is mounted a three-pronged hook 34 upon which the shell may be mounted in a vertical position as illustrated in Figure 11. The mounting of the shell may be carried out as described for Figure 3, that is the middle prong of the hook 34 is engaged in the first small lobe of the shell adjacent the lobe 3 so as to position the shell in such a way that the bottom 30 of the ring 29 will come opposite the division between the two grades of meat in the shell. The lid 15 fits down over the pan 6 and retains the shells in place. When the pan is rotated the meat is thrown from the shells, one grade into the pan 6 below the bottom 30 and the other grade above said bottom to be retained in the ring 29. The bottom 30, therefore, provides a partition by which the meat is divided and kept separated. In the case illustrated in Figure 11 the shaft 10 extends upwardly to engage the cover 15 which may thus assist in centering the device. At the completion of the shelling operation the cover 15 is removed and after removing the shells, the ring 29 may be lifted out and the meat collected therein emptied into one receptacle while the pan 6 may be emptied into another receptacle.

It will be seen, therefore, that in accordance with this invention a method is provided wherein the Crustacea have their appendages removed and are then divided transversely of the lobes, the transverse shell part 5 being removed, and are then placed in the centrifugal device whereby the meat is subjected to the action of centrifugal force while the shell is retained so that the meat is thrown therefrom. The shells are so retained that their open ends are entirely unobstructed so that there will be no tearing or mutilation of the meat.

It will be noted that in accordance with this invention the shells are supported in such a manner that their open ends are entirely unobstructed so that there will be nothing to interfere with the easy passage of the meat out of the shell. Accordingly the extracting can be carried out under a greatly reduced centrifugal force. In other words the pan need not be rotated at such a high speed. Accordingly there is less danger that the forcing out of the meat will cause the breaking of the partitions or other parts of the shell so as to carry such parts out with the meat as some time occurs in present types of machines. This arrangement, therefore, insures not only that the meat will be extracted more completely on account of the reduced obstruction but the danger of having parts of the shell extracted therewith will be reduced to a minimum.

This invention also provides for separating the different grades of meat. While the meat is subjected to the action of centrifugal force, the different grades of meat are divided so as to separate them from one another and directed by separate channels into different receivers. The different grades are kept separated in the two receivers which may be removed and emptied independently so as to maintain the separation of the grades.

The third grade of meat, namely that contained in the claws and legs, is usually extracted at a separate operation. By removing the appendages this grade of meat is separated from the remainder and is made available for such a separate operation in which only the third grade meat is extracted. This grade is, therefore, also kept separate from the others. In some operations it may also be advisable to divide all the meat into only two grades. In such cases the claws and legs may be mounted in the pan along with the shells in such a way that their meat will be delivered to those compartments in which the flake meat is received. In this way by a simultaneous operation the meat from the shells and the appendages may all be extracted at once and at the same time graded into two grades.

It is, of course, possible by further multiplication of receivers to perform the entire division into three grades of meat at a single operation.

It is obvious that various changes may be made in the details of construction without departing from the spirit of this invention; it is to be understood, therefore, that this invention is not to be limited to the specific details shown and described.

Having thus described the invention, what is claimed is:

1. The method of removing the meat from the shell of Crustacea consisting in dividing the body transversely of the lobes, subjecting the meat to the action of centrifugal force and separating the lump from the flake while being extracted from the shell.

2. The method of removing the meat from the shell of Crustacea consisting in dividing the body transversely of the lobes, subjecting the meat to the action of centrifugal force and directing the lump and flake into separate channels.

3. The method of removing the meat from the shell of Crustacea consisting in dividing the body transversely of the lobes, placing the shell with a division between the lump and flake and subjecting the meat to the action of centrifugal force.

4. The method of removing the meat from the shell of Crustacea consisting in dividing the body transversely of the lobes, retaining the shell with its opening unobstructed and subjecting the meat to the action of centrifugal force while the lump and flake are directed into separate channels.

5. The method of removing the meat from the shell of Crustacea consisting in dividing the body transversely of the lobes, removing a transverse shell part and subjecting the meat to the action of centrifugal force while the lump and flake are directed into separate channels.

6. An apparatus for shelling Crustacea comprising, a carrier adapted and mounted for rotation at high speed, means for supporting the shell body on said carrier, and retaining means engaging the shell at its open edge and characterized by the feature that said retaining means are free from elements obstructing the interior portion of the shell opening.

7. An apparatus for shelling Crustacea comprising, a carrier adapted and mounted for rotation at high speed, and a hook adapted to embrace the edge of the shell to retain the same by said edge only while the meat is being thrown therefrom.

8. An apparatus for shelling Crustacea comprising, a carrier adapted and mounted for rotation at high speed, and a hook adapted to embrace the edge of the shell at its open edge to retain the same by said edge only while the meat is being thrown therefrom.

9. An apparatus for shelling Crustacea comprising, a carrier adapted and mounted for rotation at high speed, and means for positioning the shell and for dividing the lump from the flake while being thrown from the shell.

10. An apparatus for shelling Crustacea comprising, a carrier adapted and mounted for rotation at high speed, and means for positioning the shell and for dividing the lump from the flake and for directing the same into separate channels.

11. An apparatus for shelling Crustacea comprising, a carrier adapted and mounted for rotation at high speed, means for retaining the shell while the meat is being thrown therefrom, and means for separating the lump from the flake.

12. An apparatus for shelling Crustacea comprising, a carrier adapted and mounted for rotation at high speed, means for retaining the shell while the meat is being thrown therefrom, and a partition between the lump and flake.

13. An apparatus for shelling Crustacea comprising, a carrier adapted and mounted for rotation at high speed, a partition adapted to separate the lump from the flake, and means for positioning the shell with respect to said partition.

14. An apparatus for shelling Crustacea comprising, a carrier adapted and mounted for rotation at high speed, means for supporting the shell body on said carrier, and means for separately receiving the lump and the flake meat.

15. An apparatus for shelling Crustacea comprising, a carrier adapted and mounted for rotation at high speed, means for positioning the shell and for dividing the lump from the flake while being thrown from the shell, and means for separately receiving the lump and the flake meat.

16. An apparatus for shelling Crustacea comprising, a carrier adapted and mounted for rotation at high speed, means for positioning the shell and for dividing the lump from the flake while being thrown from the shell, and a series of separate compartments for receiving the lump and the flake meat.

17. An apparatus for shelling Crustacea comprising, a carrier adapted and mounted for rotation at high speed, means for supporting the shell body on said carrier, and separate receivers for the lump and the flake meat adapted to be emptied independently.

18. An apparatus for shelling Crustacea, comprising, a carrier adapted and mounted for rotation at high speed, means engaging the shell at one edge only for supporting the shell on said carrier, and means engaging the rear part of the shell adapted to retain the same while the meat is being thrown therefrom.

19. An apparatus for shelling Crustacea, comprising, a carrier adapted and mounted for rotation at high speed, a partition adapted to separate the lump from the flake, and shell retaining means alined with said partition.

20. An apparatus for shelling Crustacea, comprising, a carrier adapted and mounted for rotation at high speed, means for supporting the shell on said carrier, retaining means engaging the shell at one only of its open edges to retain the same while the meat is being thrown therefrom, and means adapted to prevent tipping of the shell.

21. An apparatus for shelling Crustacea, comprising, a carrier adapted and mounted for rotation at high speed, means for supporting the shell on said carrier, retaining means engaging the shell at one only of its open edges to retain the same while the meat is being thrown therefrom, and means engaging the body of the shell to prevent tipping thereof.

In testimony whereof I affixed my signature this 20th day of April, 1925.

KARL D. UMRATH.